(No Model.)
M. T. HARRIGAN & J. L. PACKARD.
ROTARY TRIMMER.
No. 473,874. Patented Apr. 26, 1892.
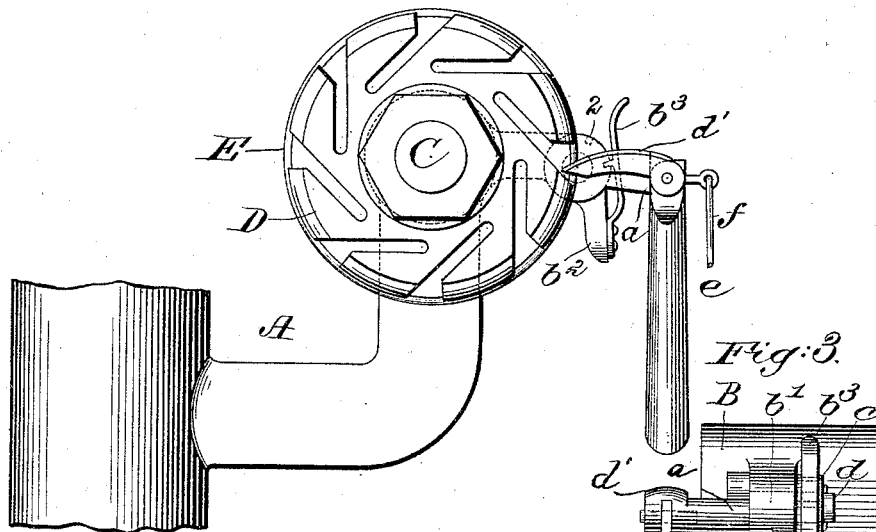
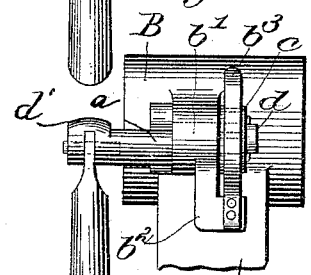
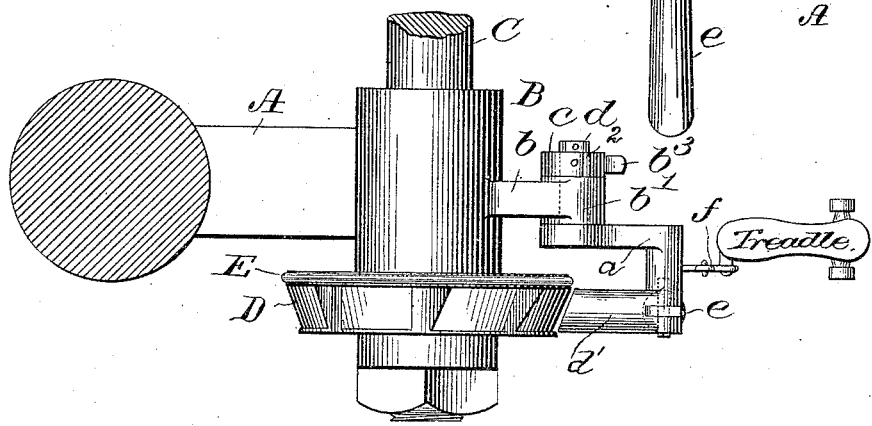
Witnesses.
Fred S. Greenleaf
Edward F. Allen
Inventors,
Michael T. Harrigan
Jerome L. Packard
by Crosby & Gregory Attys.

UNITED STATES PATENT OFFICE.

MICHAEL T. HARRIGAN, OF WOLLASTON, AND JEROME L. PACKARD, OF BOSTON, ASSIGNORS TO JAMES W. BROOKS, TRUSTEE, OF CAMBRIDGE, MASSACHUSETTS.

ROTARY TRIMMER.

SPECIFICATION forming part of Letters Patent No. 473,874, dated April 26, 1892.

Application filed December 7, 1891. Serial No. 414,295. (No model.)

*To all whom it may concern:*

Be it known that we, MICHAEL T. HARRIGAN, of Wollaston, county of Norfolk, and JEROME L. PACKARD, of Boston, county of Suffolk, State of Massachusetts, have invented an Improvement in Rotary Trimmers, of which the following description, in connection with the accompanying drawings, is a specification, like letters and figure on the drawings representing like parts.

In the use of rotary trimmers in trimming heels and sole-edges it is at times necessary to be able to bring or present any part to be trimmed in just the proper position with relation to the edge of the rotary cutter. During the time that the trimmer acts the material being trimmed to shape is supported on a suitable rest or work-support, and it is chiefly to this work-support or rest that this our invention is directed. To afford the greatest range of adjustment, we have mounted the rest so that it may tip about a center of motion substantially in a plane tangent to the circle in which travels the periphery of the cutter, and with the tipping rest we have connected an actuating-rod joined, it may be, to a treadle on the floor or adapted to be engaged and moved by hand. The rest has combined with it a locking device to hold it firmly in either of its two extreme positions.

Figure 1 in front elevation shows a trimmer-cutter with our improved rest or work-support added; Fig. 2, a top or plan view of the parts shown in Fig. 1, and Fig. 3 a right-hand side elevation of the parts shown in Fig. 1.

In the drawings, let A represent a rigid part of the frame-work of suitable shape for the working parts, the part A having a bearing B for the rotating shaft C, on which is secured the rotary trimmer D, having any usual rand-guard E.

The hub B has an arm $b$, provided with a bearing $b'$ and an ear $b^2$, and, as herein shown, said ear has connected to it a locking device $b^3$, shown as a spring, having a projection adapted to enter one of a series of like notches, as 2, in a collar $c$, suitably secured by a pin or otherwise to the inner end of a short shaft $d$, extended from the rest or support $d'$, the latter being, preferably, an arm extended at right angles to the short shaft $d$, the said shaft having rigidly attached thereto the crank-arm $a$. (Best shown in Fig. 2.) The rest extends forward from this crank-arm and is somewhat convex at its upper surface, the said pivot having its axis parallel to the shaft of the cutter and in a plane which is substantially tangent to the periphery or path of the acting edge of the cutter, so that if said pivot were prolonged it would just contact with the cutter D. The rest has attached to its outer end, as shown, a rod or operating device $e$, which in practice may be attached by link $f$ to a suitable treadle $t$, (partially shown in Fig. 2,) or the said rod $e$ may be engaged and moved by hand. The path of movement of the rest intersects the cutting-edge of the cutter, the plane of such path being at right angles to the axis $d$ of the rest. The treadle is preferable, as the operator's hands are thus both left free.

The drawings show the rest in the position it will occupy when the rear part or side of a heel is being trimmed; but should the breast corners of a heel be set or formed close to a curved shank then to enable that part of the heel to be properly acted upon by the cutter the rest will be tipped, so that its upper surface will be elevated, and the spring-catch will enter the upper notch shown in the collar $c$ in Fig. 1. The end of the treadle with which the rod $f$ is connected will preferably be spring-supported.

It is not intended to limit this invention to the exact shape for the rest or of its locking device.

Having described our invention, what we claim, and desire to secure by Letters Patent, is—

1. In a trimmer mechanism, a rotary cutter combined with a pivoted tipping rest, the pivot or axis of motion of said rest being parallel to the actuating-shaft of the cutter and in a plane substantially tangent to the periphery of the cutter, and a crank-arm rigidly connecting said pivot and rest, the path of movement of the rest intersecting the cutting-edge of the cutter, substantially as described.

2. A rotary trimmer-cutter combined with a pivoted rest and with an automatic locking device, substantially as described, to positively engage and restrain said rest from movement in its extreme positions, substantially as described.

3. A rotary trimmer-cutter and a pivoted rest, the pivot thereof being parallel to and in substantially the same horizontal plane with the cutter-axis, and a crank-arm rigidly connecting said pivot and rest, combined with a rod connected to said rest to move it on its pivot to tip toward or away from the face of the cutter, substantially as described.

In testimony whereof we have signed our names to this specification in the presence of two subscribing witnesses.

MICHAEL T. HARRIGAN.
JEROME L. PACKARD.

Witnesses:
GEO. W. GREGORY,
FREDERICK L. EMERY.